(12) United States Patent
Schnell

(10) Patent No.: US 9,667,890 B2
(45) Date of Patent: May 30, 2017

(54) METHOD FOR VISUALIZING SPATIALLY-RESOLVED MEASUREMENT RESULTS AND CORRESPONDING MEASURING ARRANGEMENT

(75) Inventor: Martin Schnell, Munich (DE)

(73) Assignee: Testo AG, Lenzkirch (DE)

( * ) Notice: Subject to any disclaimer, the term of this patent is extended or adjusted under 35 U.S.C. 154(b) by 517 days.

(21) Appl. No.: 13/516,318

(22) PCT Filed: Dec. 8, 2010

(86) PCT No.: PCT/EP2010/007465
§ 371 (c)(1),
(2), (4) Date: Jun. 15, 2012

(87) PCT Pub. No.: WO2011/082754
PCT Pub. Date: Jul. 14, 2011

(65) Prior Publication Data
US 2012/0257049 A1    Oct. 11, 2012

(30) Foreign Application Priority Data

Dec. 15, 2009  (DE) .......................... 10 2009 058 324
Feb. 26, 2010  (DE) .......................... 10 2010 009 476

(51) Int. Cl.
*H04N 5/33* (2006.01)
*G06T 11/00* (2006.01)

(52) U.S. Cl.
CPC ............. *H04N 5/33* (2013.01); *G06T 11/001* (2013.01)

(58) Field of Classification Search
CPC ........ H04N 5/33; H04N 9/43; H04N 13/0253; H04N 1/484; H04N 5/2258; G01B 9/08; G01J 5/0265; G01J 2005/0081; G01J 5/08; G01K 13/002; G06T 11/001
USPC ............................... 342/25, 26, 29, 125, 836
See application file for complete search history.

(56) References Cited

U.S. PATENT DOCUMENTS

| | | | | |
|---|---|---|---|---|
| 4,642,687 A | * | 2/1987 | Wedgwood | G01N 29/0627 348/162 |
| 5,450,467 A | * | 9/1995 | Pellegrino | H02M 7/106 378/205 |
| 5,496,106 A | * | 3/1996 | Anderson | H04N 5/23293 348/255 |
| 5,949,582 A | * | 9/1999 | Coombs | G02B 27/017 348/E5.09 |
| 6,364,829 B1 | * | 4/2002 | Fulghum | A61B 1/00009 600/160 |
| 6,995,565 B1 | * | 2/2006 | Tulloch | G01R 31/308 324/514 |

(Continued)

FOREIGN PATENT DOCUMENTS

| | | | | |
|---|---|---|---|---|
| DE | 102005019143 A1 | | 11/2006 | |
| DE | 102005018856 | * | 2/2009 | ................ G01J 5/08 |

(Continued)

*Primary Examiner* — Jay Patel
*Assistant Examiner* — Marnie Matt
(74) *Attorney, Agent, or Firm* — Volpe and Koenig, P.C.

(57) ABSTRACT

In a measuring apparatus (8) having a measuring unit (1) according to the invention a spatially resolved measurement result detected using the measuring unit (1) of an object (16) is converted into a false-color image, and the false-color image is cast back or projected onto the object (16) by a display device (3).

12 Claims, 4 Drawing Sheets

(56) References Cited

U.S. PATENT DOCUMENTS

| | | | |
|---|---|---|---|
| 8,823,934 B2 * | 9/2014 | Chhibber | A61B 5/0059 356/364 |
| 2004/0017547 A1 * | 1/2004 | Kamm | G03B 17/54 353/28 |
| 2005/0285953 A1 * | 12/2005 | Hasegawa | G06T 7/0024 348/239 |
| 2006/0062448 A1 * | 3/2006 | Hirsch | A61B 5/0059 382/154 |
| 2006/0081777 A1 * | 4/2006 | Bevan | G01J 5/0003 250/330 |
| 2006/0122515 A1 * | 6/2006 | Zeman | A61B 5/0059 600/473 |
| 2006/0289768 A1 * | 12/2006 | Vallese | G01J 5/02 250/353 |
| 2007/0156038 A1 * | 7/2007 | Zeman | A61B 5/0059 600/315 |
| 2008/0259184 A1 * | 10/2008 | Shingu | G06K 9/22 348/231.99 |
| 2009/0015460 A1 * | 1/2009 | Fox | G01S 7/2922 342/53 |
| 2009/0050806 A1 * | 2/2009 | Schmidt | H04N 5/2254 250/332 |
| 2009/0174798 A1 * | 7/2009 | Nilsson | G06T 7/004 348/294 |
| 2009/0185141 A1 * | 7/2009 | Chen | G02B 27/48 353/38 |
| 2009/0202119 A1 | 8/2009 | Hefti et al. | |
| 2009/0289950 A1 | 11/2009 | Hamano et al. | |
| 2010/0148066 A1 * | 6/2010 | Stratmann | H04N 5/232 250/330 |
| 2010/0265332 A1 * | 10/2010 | George-Svahn | G01J 5/02 348/164 |
| 2011/0121978 A1 * | 5/2011 | Schworer | G01J 5/02 340/588 |
| 2011/0213252 A1 * | 9/2011 | Fulghum | A61B 1/00009 600/476 |

FOREIGN PATENT DOCUMENTS

| | | | | |
|---|---|---|---|---|
| DE | WO 2009024300 A1 * | 2/2009 | | G01J 5/02 |
| DE | 102005018856 B4 * | 5/2009 | | G01J 5/08 |
| EP | 2074933 A1 | 7/2009 | | |
| GB | 2478903 A * | 9/2011 | | G01J 5/02 |

* cited by examiner

METHOD FOR VISUALIZING SPATIALLY-RESOLVED MEASUREMENT RESULTS AND CORRESPONDING MEASURING ARRANGEMENT

BACKGROUND

The invention relates to a method for visualizing spatially resolved measurement results, wherein a measuring unit establishes a spatially resolved measurement result of an object and a false-color image is obtained from the spatially resolved measurement result.

The invention furthermore relates to a measuring arrangement, comprising a measuring unit, which is configured to capture a spatially resolved measurement result in a first solid angle region, a conversion and data-processing unit, which is configured to obtain a false-color image from the spatially resolved measurement result, and a representation unit for outputting the false-color image.

Here, a spatially resolved measurement result of an object is understood to mean any two-dimensional arrangement of measurement values, with the arrangement describing an assignment of the individual measurement values to different spatial regions of the object. Examples of spatially resolved measurement results include thermal images, X-ray images, sound images.

It is known to record such measurement results by contactless measurements from the distance.

It is often desirable to provide the simultaneous or almost simultaneous visualization of the measurement results in a manner that is as clear and obvious as possible.

The previous procedure has been that of measuring the property using the measurement instrument and converting it into a false-color image, which is then generally shown on a small display or stored. Thus, the user is forced to alternate his attention between the display and then the real object again and he must attempt in his imagination to bring the image on the display into correspondence with the real object.

Here, a false-color image is understood to mean any two-dimensional representation of a spatially resolved measurement result, in which the individual measurement values are respectively assigned a color and/or brightness value in a color or brightness code.

There are many properties of objects which are invisible. One such property is the surface temperature or the blackbody radiation, which, according to Planck's law, is emitted by every body with a finite temperature. Thermography describes the contactless measurement of the surface temperature and the conversion of the measurement into a spatially resolved image, which is typically displayed as a false-color representation on an indication instrument (display or monitor). A commonly used (but arbitrary) color coding is the use of red and yellow for warm and hot regions, and of blue and black for cold regions.

Thermographic measurements have many application options; a few examples:
- examining buildings in order to identify defects in the thermal insulation
- seeking leaks in water pipes that run within the floor or a wall and are therefore invisible and inaccessible
- detecting mold infestation in buildings
- measuring plants and machines in order to find defects such as leaks or poor mechanical or electrical connections (if these can be detected by a temperature difference)
- measuring electronic circuits to detect faults such as poor contacts or non-functioning components
- seeing residual heat in forensics, at points where a person was present
- identifying inflammation foci in medical examinations; this is also often used in the field of veterinary medicine.

In these applications, the measured temperature differences are often only of the order of a few tenths of a degree, which can be captured well by the cameras.

Here, thermographic images are typically recorded by a suitable camera or a scanner, and are subsequently processed in a report in which the images recorded by the thermographic camera are printed and provided with appropriate explanations. A disadvantage of such a report always is that it is difficult to orient oneself on the basis of the usually relatively low-resolution images. Furthermore, this mode of operation is disadvantageous in that time passes between the measurement using the thermographic camera and the completion of the report: it may take days or weeks until a report has been completed. This increases the risk of incorrect assignments of the images to the observed objects.

In particular, the creation of a report is not suitable in the case of urgent and time-critical measurements for finding defects or leaks in e.g. a water pipe or heating pipe with a rupture within a wall because further damage is made while the report is being created. It is important and helpful to both the owner of the building and the skilled worker who should fix the problem to know the point as quickly and directly as possible in order to be able to resolve the problem in a quick and targeted fashion and, in the process, cause as little additional damage as possible, for example as a result of ripping open relatively large areas of the wall. Moreover, in the case of printed images in a report, it is difficult to re-localize the precise position (of the damage) on the object in situ as a result of the often low-resolution images in the report.

The low resolution of thermographic images can also be seen as a system-typical disadvantage of thermographic cameras per se.

A further feasible field of application lies in forensics or forensic sciences, with other wavelength regions also being considered in this case: the range of ultraviolet radiation (wavelength less than approximately 400 nm) or radiation in the range of near infrared (wavelength greater than approximately 700 nm up to 1400 nm). In the case of forensic analyses of a crime scene by investigative and law-enforcement authorities, invisible leads are sought after and the aforementioned wavelength ranges can provide important clues. There are sensors and cameras which can record images in these invisible wavelength ranges and thus, for example, make it possible to identify traces of blood.

Since, in contrast to the thermographic application above, the objects observed in this case typically are not active emitters, work must optionally be undertaken with an additional, suitable radiation source and the observed solid angle region must be correspondingly illuminated; the reflected light is then measured in this case.

Here, the current prior art is once again a similar mode of operation as in thermography: the images can be recorded and stored and then integrated into reports with a time delay. In the case of the court hearing, this is surely necessary and also sufficient. However, the time delay is a significant disadvantage for ongoing investigations because such leads should be visible as clearly, directly and instantaneously as possible.

The disadvantage in this course of action lies in the fact that there is a relatively long time (hours/days or weeks) between the measurement and the availability of the report and hence between the report and possible (preventative) measures.

A further disadvantage lies in the fact that a representation on a small display is not immediately and easily identifiable for a plurality of persons such as e.g. an investigation team. Moreover, the representation is indirect and the identifiable image on the display must be made to be congruent with the real objects in the imagination.

A further disadvantage lies in the fact that such reports may, under certain circumstances, be difficult to understand for e.g. a skilled worker who should undertake repairs at a specific point and hence make carrying out the repairs more difficult because it is unclear precisely where each recording was created: in the case of detailed recordings of interior spaces such as e.g. walls, room corners, radiators and roller shutter casings there by all means is the risk of subsequent mix-ups.

Even in the case of the examination directly in situ with an appropriate camera the images are still indirect because they can only be seen on a—usually small—monitor and this relates precisely to measured parameters that are invisible. Whoever has worked with a corresponding instrument knows that it can by all means be difficult to find precisely the correct point on e.g. an object like a wall under which one according to the displayed measurement results on the monitor believes there to be a defect like a broken water pipe.

The prior art furthermore includes the representation instruments that are used by methods according to the invention; these are distinguished by at least the following properties:
- the representation instrument has a suitable input for the signal which was measured by the measuring instrument and which represents, in a spatially resolved fashion, the measured property in the solid angle as e.g. false-color image
- the representation instrument projects a spatially resolved image in a specific solid angle region in the visible wavelength range of the light (i.e. in the wavelength range between approximately 400 nm and 700 nm).

Examples include beamers or projectors, as also used for the magnified representation of image data such as e.g. presentations or else films by means of computers and as are commercially available in large numbers and in many different embodiments. A problem of instruments that use a conventional, incoherent light source such as e.g. a halogen lamp is that, in the envisaged application, one can generally not make the assumption that a planar surface is being examined. According to classical optics, such instruments, due to their underlying principles, usually only have a small distance range in which a sharp image representation is possible (small depth of field) and hence there is the problem in an application at an arbitrary observation angle to a plane or in the examination of non-planar objects that parts of the image are usually out of focus.

Thus, in principle, a better option for the representation are laser-based instruments, which are already available in small quantities (state: December 2009) and are provided as large film projectors or as miniaturized projectors for application in mobile electronic instruments such as cellular telephones. As a result of the very small beam-widening property of the laser beam, there is a sharp representation independently of the projection distance.

This is particularly advantageous if the application within the meaning of the invention is dynamic and the observed solid angle region and the location and the spatial orientation of the combined measurement and representation are changed quickly by the user.

Furthermore, the laser-based beamers are particularly small and light and they can, for example, be operated by batteries, which advantageously eases the energy supply during the use according to the invention.

SUMMARY

The invention is based on the object of finding a method which makes it possible to see, as immediately and directly as possible, a property not visible to the human eye.

According to the invention, in order to achieve the object, provision is made in a method of the type described at the outset for the false-color image to be projected onto the object by a representation unit.

Projecting the false-color image onto the examined object opens up the possibility of making visible, as immediately and directly as possible, the spatially resolved measurement result measured by a suitable measuring unit—such as e.g. by a thermographic camera or a camera designed for the ultraviolet or near infrared range or by any other measuring instrument that captures a property of objects which is not directly visible but can be measured in a spatially resolved fashion. Thus, as a result of such a method, the invisible property can be visualized with as little time delay as possible and in dynamic fashion, which significantly simplifies the work for users of the method or which enables new modes of operation.

Hence, the advantage emerges for the user of the method according to the invention that the measured property is immediately made visible, which serves the clarity and which, depending on application, allows faster and more accurate reactions. By way of example, the invention can be used to localize hidden defects in plants or in buildings more easily and thus to remedy said defects in a targeted manner. A further application option lies in the field of forensic investigations if object properties which cannot be identified in the visual range are sought after; a visualization which is clear and as obvious as possible is important and desirable in this case too.

Economic application options are provided according to the definition of the technical object, be it by the potential for saving costs as a result of simpler, faster and better error seeking or in the improvement of the options in e.g. forensic analyses.

On the basis of the method according to the invention it is possible to construct an instrument by means of which the method can be applied in a simple fashion; such an instrument can be produced commercially and thus constitutes a direct economic application in the form of production and sale of corresponding instruments.

However, the method according to the invention for visualization is not restricted to the described and commercially available measuring instruments (thermographic camera and UV/IR camera). In principle, the method can be combined with all currently available and future measuring instruments that have at least the following properties:
- the variable to be measured is captured from the distance
- the measurement is spatially resolved and covers a solid angle region
- the distance to the measurement variable is approximately in the range of a few centimeters up to a few kilometers (the ranges of the representation instrument or the measuring instrument are the limiting factor)

the measurement data must be available in transmittable and processable form such as e.g. a suitably encoded electric signal; advantageously in a form which repeatedly updates over time such as e.g. by a video signal.

DETAILED DESCRIPTION OF THE PREFERRED EMBODIMENTS

Figure 1:
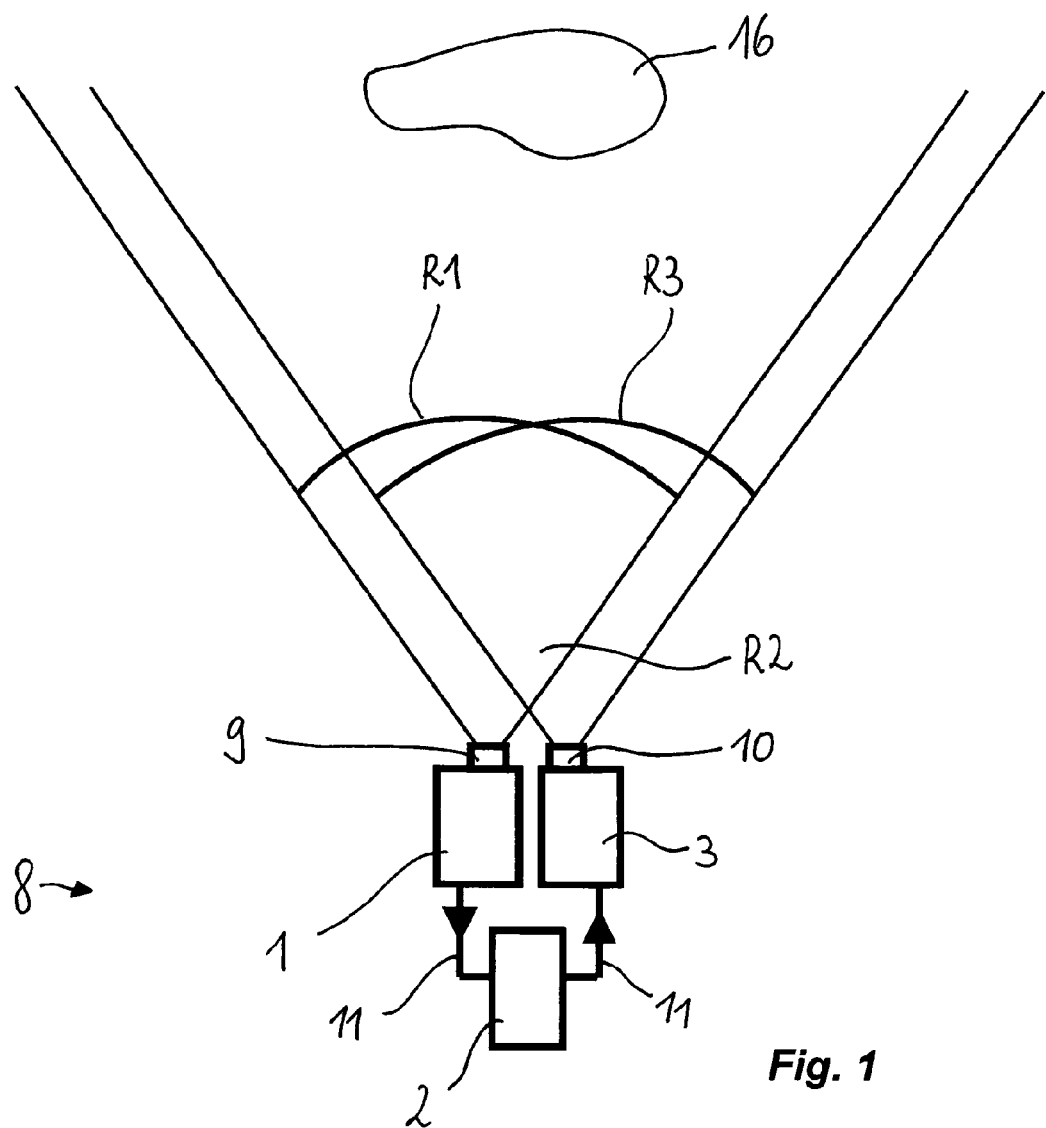
FIG. 1 provides a plan view of a measuring arrangement for carrying out the method according to the invention.

Thus, according to the invention, a method is proposed for visualizing spatially resolved measurement results of a property not immediately visible to the human eye, which property is initially captured from the distance in a solid angle region R1 by a suitable measuring unit 1, e.g. by a measuring instrument, of a measuring arrangement 8 and then, after possible buffer storage and conversion or automated data-technical processing of the measurement data by means of a conversion and data-processing unit 2 of the measuring arrangement 8 for conversion into a false-color image with freely selectable color or brightness code, this false-color image is transmitted onward to a representation unit 3 of the measuring arrangement 8, such as e.g. a projector or a beamer or a laser-based projection unit, and then immediately projected into the solid angle region R3 as image of the transformed measurement values in the wavelength range visible to the human eye in the most timely fashion with the measurement such that the observed object is illuminated in color, wherein the local color or the brightness is determined by the measurement values and this is how the measurement results are visualized immediately, wherein it is important that the solid angle regions R1 and R3 advantageously correspond as closely as possible and hence the common solid angle region R2, in which the solid angle regions R1 and R3 overlap, is as large as possible.

In order to achieve correspondence between the solid angle regions R1 and R3 which is as precise as possible, it is advantageous to arrange the measuring unit 1 and the representation unit 3, e.g. a representation instrument, with spatially as little distance between them as possible in order to avoid a disturbing parallax; furthermore the aperture angle of the measuring unit 1 and of the representation unit 3, which define the solid angle, should be matched to one another as precisely as possible.

An example of such a property is the surface temperature, which can for example be measured contactlessly by a thermographic camera by means of the invisible thermal radiation (infrared radiation, often in the wavelength range between 8 and 12 μm). Advantageously, the signal from a camera unit 4 for the visual range can also be used when the false-color image is determined by the conversion and data-processing unit 2 in order to take account of and compensate for the optical properties of the observed objects in the visual range.

In the illustrated measuring arrangements 8, the connecting lines between the components symbolize data flow in the measuring arrangement 8.

Further examples are ultraviolet or near infrared radiation and, in principle, other electromagnetic radiation such as radio waves, microwaves or else radioactive radiation or else sound waves to the extent that there is a suitable measuring instrument for these for the spatially resolved measurement from the distance.

What is measured is either, as in the case of the example of the thermographic camera, the emission of thermal radiation or, as in the example of the near infrared light or the ultraviolet light, the reflection of present radiation or, alternatively, the reflection in the case of irradiation of the object by means of a suitable light source.

What is decisive is that the measurement can be carried out from the distance in a spatially resolved fashion over a specific solid angle region such that a static image or, advantageously, a moving image is obtained. Unlike in previous methods, this image information now should not only be displayed on a display or stored, but rather it should be visualized directly and immediately, i.e. made visible, on the observed object, wherein it is self-evident that storage and display on a display are still optionally possible.

In one embodiment, provision can be made for the false-color image to be updated continuously or repeatedly. As a result, new solid angle regions can be recorded and illuminated continuously.

Particularly expedient usage properties can be achieved if the projection is carried out simultaneously with the establishment of an updated spatially resolved measurement result.

It is self-evident that in addition to projecting the measured signal, one is still free to represent it on a display or monitor 5; this is still required in some situations and continues to allow the conventional mode of operation and, for example, the creation of a report—storing the measurement data and optionally the data from the visual camera as well is suitable for this.

The method does not depend on whether the aforementioned elements are integrated into a housing or whether they are available as modules, in which case they then expediently comprise connection options for data interchange and are advantageously able to be mechanically interconnected.

The invention can be used in a broad spectrum of applications. By way of example, provision can be made for a physical property of the object not immediately visible to the human eye to be captured and evaluated for establishing the spatially resolved measurement result. A list of examples for this comprises emitted electromagnetic and/or acoustic and/or ionizing wave fields.

It is particularly expedient if image regions of the false-color image, which are assigned to an object region of the object in each case via the spatially resolved measurement result, are projected onto the respective object regions. As a result, it is possible to carry out a direct investigation of the observed scene.

In order to support the investigation, provision can be made for the representation unit to be used to project additional information onto the object.

In order to compensate for interference by a scene background, provision can be made for a color and/or brightness encoding to be used for the false-color image, which encoding takes account of the color and/or brightness properties of the object.

To this end, provision can for example be made for an image of the object to be additionally recorded in the visual wavelength range. By evaluating the image it is possible to obtain information in respect of color and/or brightness properties, for example emission, transmission and/or reflection values.

This can easily be brought about by virtue of the fact that the object is illuminated uniformly by the representation unit for the purpose of capturing the color and/or brightness properties.

For improved capture of measurement values, provision can be made for a radiation source to be used to activate the property of the object not immediately visible to the human eye.

In one embodiment, provision can be made for the projection to be carried out by means of laser beams. An advantage in this case is that a great image sharpness of the projected image can be achieved.

According to the invention, in order to achieve the object, provision is made in a measuring arrangement of the type mentioned at the outset for the representation unit to be configured to project the false-color image into a second solid angle region, which second solid angle region overlaps with or corresponds to the first solid angle region. Hence, the first solid angle region can be contained within the second solid angle region or vice versa, or the first solid angle region and the second solid angel region can have a common solid angle region.

In order to carry out the method according to the invention, a camera unit can be embodied to record in the visual wavelength range.

In order to achieve good correspondence between the projected image and the scene captured in the solid angle region, provision can be made for the measuring unit and the representation unit, in particular with the first solid angle region and the second solid angle region, to be or to be able to be aligned with respect to one another such that a parallax is minimized.

In order to project the false-color image, the representation unit can have a projector or a beamer, more particularly a laser projector or a laser beamer.

In order to improve the recording result, provision can be made for a radiation source which is configured to activate a physical property of an irradiated object, wherein the measuring instrument is sensitive to the physical property.

Good usage properties can be achieved if the measuring unit and/or the representation unit and/or the or a radiation source and/or the conversion and data-processing unit and/or the or a camera unit and/or the or a display unit are arranged in a common housing, more particularly as a handheld instrument.

Further Embodiments

Using the invention makes it possible to form further embodiments, some of which will be explained below in an exemplary fashion. For explanatory purposes use can be made of the figures, with the reference signs between parentheses relating to the details thereof in a non-restrictive manner.

Embodiment No. 1

In one embodiment of the invention of a method for visualizing spatially resolved measurement results of properties not immediately visible to the human eye, provision can be made for the property, initially measured from the distance in a solid angle region R1 by the measuring unit (1) or the measuring instrument, subsequently to be optionally buffer-stored or converted or to be converted into a false-color image with freely selectable color or brightness encoding by automated data-technical processing of the measurement data by means of a conversion and data-processing unit (2) or device, which false-color image is transmitted onward to a representation unit (3) and is finally immediately projected into the solid angle region R3 as image of the transformed measurement values in the wavelength range visible to the human eye in the most timely fashion with the measurement such that the observed object is illuminated in color, wherein the local color or the brightness is determined by the measurement values and this is how the measurement results are visualized immediately on the observed object, wherein the solid angle regions R1 and R3 advantageously correspond as closely as possible and the spatial distance between the measuring unit (1) or the measuring instrument and the representation unit (3) or representation apparatus is advantageously as small as possible in order to minimize a disturbing parallax between the measured and the projected image; the conversion and data-processing unit (2) or device (2) can optionally also carry out volatile or non-volatile recording or storage of the measurement results and possibly further information, or transmit the data to further instruments such as e.g. a computer network.

The embodiment no. 1 offers the following additional advantages: in a preferred application in forensic sciences or forensics it is of great advantage to a team of investigators if the measured property, which is not directly visible to the human eye, can, according to the invention, be made visible immediately on site and directly on the object and if the site and the surroundings can be investigated very quickly and easily using the method according to the invention. Easily means that the method according to the invention is applied using e.g. a mobile, advantageously battery-operated instrument and, like in the case of a "magic torch", in order to carry out the method the observed solid angle is varied by pivoting an instrument and possible leads are thus sought after, wherein the user or users do not look at a small display but are able to concentrate on the examined objects on which the measured property is then visualized in a visible manner by the projected false-color image. Particularly in the case of such an application it can be of great importance that the leads are able to be identified as quickly as possible because a suspect may be on the run or human lives may even be at stake.

In the procedure according to the invention for the preferred application for seeking a defect or a hidden leak, for example in a pipe of an under-floor heating using a thermographic measuring instrument, it is likewise a substantial advantage if the corresponding site can be made visible directly and can be visualized such that it is possible, for example, to mark the site with a simple pen and then start the repair works. It is also possible to repeatedly re-measure during the repair works and the problem point is in each case displayed immediately.

The correspondence of solid angle regions R1 and R3 is almost trivial in theory but difficult to implement using existing commercially available instruments because the optical systems of beamers or projectors almost all capture other angular ranges than are, for example, measured as a standard by most thermographic cameras. Thus, one requires a specifically adapted lens system or a specifically adapted laser-based instrument as representation unit (3) or as representation instrument (3), or even an adapted special optical system for the respective measuring unit (1) or the respective measuring instrument (1).

A further advantageous application is feasible for visualizing radioactivity (assuming a spatially resolved measuring instrument), which may be a life-saving advantage for somebody moving in partly contaminated regions because said person can see where there are great levels of contamination immediately where they are moving into.

A further application can, with the aid of ultrasound and a corresponding spatially resolved measuring instrument, be used to characterize the hardness of objects or to visibly highlight a flying or hovering object, for example for scientific applications.

The optional possibility of also storing the image data enables and simplifies the conventional mode of operation, in which a report is created with images of the measurement data from the measuring instrument (1); this course of action should of course not be replaced by the described method, but merely be improved. For documentation purposes, storing the measurement data using the data-processing unit (2) in particular is helpful.

Embodiment No. 2

In embodiment no. 1, provision can additionally be made for additionally one camera unit (4) or camera apparatus (4) for the wavelength range visible to the human eye to be used as well, said camera unit or camera apparatus capturing the solid angle region R4, which advantageously corresponds as precisely as possible to the whole solid angle region R3, or only a sub-region thereof, illuminated by the representation unit (3) or display unit (3) and the image signal of which is transmitted to the conversion and data-processing unit (2), where it is used to modify and improve the representation by the representation unit (3) or the representation instrument by virtue of the fact that the color and brightness properties of the observed objects are automatically taken into account and compensated for, wherein the compensation can for example consist of the fact that a darker object is irradiated with more luminous intensity than a brighter object such that the measured property to be visualized becomes visible as evenly as possible for the user and without being influenced too strongly by the optical properties in the visible region; spatially, the camera unit (4) is advantageously situated as closely as possible to the measuring unit (1) or the measuring instrument (1) and the representation unit (3); the signal from the camera can either be used continuously for continuous correction or respectively one recording can be made at suitable time intervals or if another solid angle region is observed, during which recording the representation unit (3) or the display unit (3) briefly projects no light or completely white light in order thus to capture the color and brightness properties of the observed objects and the illumination situation.

Embodiment no. 2 offers the following additional advantages: the advantage of using the signal from the camera unit (4) in the conversion and data-processing unit (2) becomes clear if one imagines the following situation when applying the method according to the invention: what is sought after with the aid of a thermographic measuring instrument, for example, is a leak in a pipe of an under-floor heating; the floor consists of tiles with different colors in the visual range of the spectrum. As a result of this, the image of the projection of the representation unit (3), which image is visible as a result of reflection, naturally depends on the color of the respective tile. If this is also captured by the camera, the conversion and data-processing unit (2) can for example automatically use a different type of false-color representation or the brightness or the color of the projected image can automatically be adapted locally such that the visible representation for the user is as independent as possible from the natural color of the observed object in the visual range of the spectrum.

Embodiment No. 3

In an embodiment as per no. 1 or 2, provision can additionally be made for the measuring unit (1) and the representation unit (3) to be additionally equipped with an optional display unit (5) for displaying the measurement results, on which display unit optionally additional information in respect of the measurement data or information in respect of the status or in respect of the configuration of the system and in respect of the user interaction can also be output.

Embodiment no. 3 offers the following additional advantages: in the case of very inexpedient surrounding conditions such as too bright surroundings or very dark or black objects on which the projection is not well visible or in the case of objects that are too far away, a display on a display unit (5) can still be helpful. The display shows the false-color image of the measured property without a modification by optical properties of the object. Furthermore, a display can be of use in the case of settings for the recording parameters of the measuring unit (1).

Embodiment No. 4

In an embodiment as per one of no. 1 to 3, provision can additionally be made for use to be additionally made as well of an optional camera apparatus for the visual wavelength region, by means of which camera apparatus at least the whole observed solid angle region R1, or else only a sub-region thereof, can be recorded as appears in the illumination with the projection of the false-color representation of the measurement results, wherein the image of the camera can alternatively and optionally also be stored by the processing unit (2) or represented on the display unit (5), the display (5), or alternatively be directly stored by the camera unit or transferred to further instruments; the camera unit can advantageously be identical to the camera unit (4) from embodiment no. 2, or else it can be an additional and independent instrument.

Embodiment no. 4 offers the following additional advantages: as a result of the additional use of an optional camera unit (4) it is possible to expand and complete the documentation. It can by all means be desirable and advantageous also to capture simultaneously what is made visible by the method in as closely to the same form as possible and also optionally to store this using e.g. the conversion and data-processing unit (2).

In particular, if the method is applied e.g. using a thermographic sensor, which sensors according to the current prior art have a very low image resolution compared to photographic cameras, this makes it possible to generate an image with a much higher resolution using e.g. a normal photographic camera, which is significantly more cost effective. This is one option of greatly increasing the spatial resolution of the measuring instrument in a very cost-effective manner.

Particularly in the example mentioned here using a thermographic measuring instrument, this type of increasing the image resolution is by all means appropriate and admissible in many cases because heat tends to strive for thermal equilibrium and distributes itself, as a result of which initially sharp differences smear over time; thus, little or no detail is lost.

Embodiment No. 5

In an embodiment as per one of no. 1 to 4, provision can additionally be made for the representation unit (3) or the representation instrument (3) to carry out the projection using laser beams from one or more laser light sources and to be embodied, for example, as a laser beamer or a laser projector and, as a result thereof, always to supply a sharp image in the whole solid angle region R3, independently of the projection distance, as a result of the underlying principles.

Embodiment no. 5 offers the following additional advantages: a great advantage of using a laser-based method in the representation unit (3) is that a projection image that is sharp everywhere at the same time is obtained, particularly in the case of non-orthogonal projections or in the case of projections onto curved surfaces or in the case of simultaneous projections onto a plurality of objects which are examined and measured at the same time and which are situated at different distances from the representation unit (3). Furthermore, the representation unit (3) is simplified because there is no need for either an optical system or a mechanical system for focusing the image. In principle, the method can be applied to very large distances because there are strong lasers, wherein the appropriate safety guidelines should naturally be taken into account.

Embodiment No. 6

In an embodiment as per one of no. 1 to 5, provision can additionally be made for the representation unit (3) or the representation instrument (3) to be embodied as a projector or as a beamer.

Embodiment no. 6 offers the following additional advantages: beamers or projectors are also available with a very high luminous intensity, which enables an application of the method with such an instrument as representation unit (3) even in the case of relatively strong surrounding light being present or from a relatively large distance because the projected image is brighter and hence visible more clearly. Furthermore, as a trend, an application from larger distances is possible without being restricted by safety guidelines like in the use of lasers.

Embodiment No. 7

In an embodiment as per one of no. 1 to 6, provision can additionally be made for the measuring unit (1) or the measuring instrument (1) to be a thermographic camera, which is sensitive to radiation in the far infrared region of the electromagnetic spectrum with wavelengths e.g. in the range between approximately 8 and 12 µm.

Embodiment no. 7 offers the following additional advantages: since thermal radiation is not immediately visible to the human eye, a thermographic camera is, according to the invention, a preferred measuring instrument for which the present method for visualization is suitable. By way of example, a preferred application is the search for leaks in hidden pipes or defects in plants or buildings.

A further option lies in the cost-effective creation of high-resolution images with thermographic information, for example if the thermographic image is projected onto a whole building or else onto part thereof and is in turn photographed by a conventional camera; thermographic cameras are currently many times more expensive than conventional digital cameras and the thermographic measuring instruments only have a fraction of the pixel resolution.

Typically, during a thermographic measurement, this type of increasing the image resolution is by all means appropriate and admissible in many cases because heat tends to strive for thermal equilibrium and distributes itself, as a result of which initially sharp differences smear over time; thus, little or no detail relating to the thermal property is lost but very much resolution is gained, wherein the image is naturally at the same time combined with the normal visible image.

Embodiment No. 8

In an embodiment as per one of no. 1 to 7, provision can additionally be made for the measuring unit (1) or the measuring instrument (1) to record an image from radio waves or microwaves or terahertz radiation or radioactive radiation or X-ray radiation or from sound waves and, if need be, optionally use is made of a radiation source (6) for illuminating at least the solid angle region R1 with electromagnetic radiation with a suitable wavelength range or a transmitter of sound with a suitable frequency in order to enable a sufficiently strong (reflected) signal for the measuring instrument (1).

Embodiment no. 8 offers the following additional advantages: large regions of the electromagnetic spectrum and, naturally, sound waves or (radioactive) particle radiation are not immediately visible to the human eye and hence these types of radiation are also suitable for the visualization by means of the method according to the invention, provided that there is a suitable measuring unit (1) or a suitable measuring instrument (1) by means of which it is possible to record a spatially resolved image.

If the objects do not emit radiation or if the radiation originating from another source does not generate a sufficiently strong signal at the measuring unit (1), it lends itself to irradiate the object to be examined by a suitable radiation source (6) and thus ensure a sufficiently strong signal at the measuring instrument.

An advantageous application is feasible for visualizing radioactivity (assuming a spatially resolved measuring instrument), which may be a life-saving advantage for somebody moving e.g. in partly contaminated regions. Naturally, it is likewise advantageous if one can in fact look at the surroundings and not on the display of a measuring instrument as one advances.

A further application can, with the aid of ultrasound and a corresponding spatially resolved measuring instrument, be used to characterize the hardness of objects or to visibly highlight a flying or hovering object, for example for scientific applications.

Embodiment No. 9

In an embodiment as per one of no. 1 to 8, provision can additionally be made for the measuring unit (1) or the measuring instrument (1) to be a camera, the sensor of which records ultraviolet radiation with a wavelength less than 400 nm or radiation in the near infrared range with a wavelength of greater than approximately 700 nm, and for use optionally to be made of a radiation source (6) for illuminating at least the solid angle region R1 with electromagnetic radiation in a suitable wavelength region in order to ensure a sufficiently strong (reflected) signal at the measuring unit (1) or the measuring instrument (1).

Embodiment no. 9 offers the following additional advantages: since ultraviolet radiation is not immediately visible to the human eye, a camera suitable for this range of the spectrum is a measuring unit (1), preferred according to the invention, which is suitable for the present method for visualization.

Near infrared radiation is likewise not immediately visible to the human eye and so a camera suitable for this range of the spectrum also constitutes a measuring unit (1), preferred according to the invention, which is suitable for the present method for visualization.

If the radiation from the surroundings in the ultraviolet or near infrared range should not be sufficient for capturing a good image using the measuring unit (1), it lends itself to use a suitable artificial radiation source (6) to ensure sufficient illumination and hence a sufficient reflected signal which can be captured by the measuring unit (1).

Embodiment No. 10

In an embodiment as per one of no. 1 to 9, provision can additionally be made for the measuring unit (1), the representation unit (3), the radiation source (6), the conversion and data-processing unit (2), the camera unit (4) and the display unit (5) to be embodied in any combination as separate instruments or to be embodied partly combined in a common housing, wherein the instruments are respectively equipped with suitable devices for mutual signal transmission such that the respectively relevant data can be transmitted or received; advantageously, the instruments are mechanically designed such that at least the units or instruments (1), (3) and optionally also (4) can be arranged as closely to one another as possible in terms of space and the solid angle regions R1 and R3, and optionally R4 as well, can be brought into good correspondence; in particular, it can be advantageous to combine the conversion and data-processing unit (2) together with the representation unit (3) in a common housing of the measuring arrangement (8), which housing can then be combined with different measuring units (1) or measuring instruments (1).

It is advantageous in this case that an embodiment within a housing can ensure the spatial proximity in a particularly good manner. Furthermore, the construction can ensure the good correspondence between the solid angle regions R1 and R3 and optionally R4 as well. Furthermore, such an embodiment is particularly easy to handle.

An embodiment with partly separated housings allows a simple combination of e.g. the representation unit (3) with different measuring instruments, which often are, of course, relatively expensive investment goods. The individual instruments can then be assembled in modular fashion and parts can be used for various applications. It may be that repairs on the instruments can be carried out in a simpler or more cost-effective fashion. By way of example, it is feasible to use the representation unit (3) and conversion and data-processing unit (2) or the transmission and conversion unit (2) with both a thermographic measuring instrument and with a camera for ultraviolet light.

Figure 2:
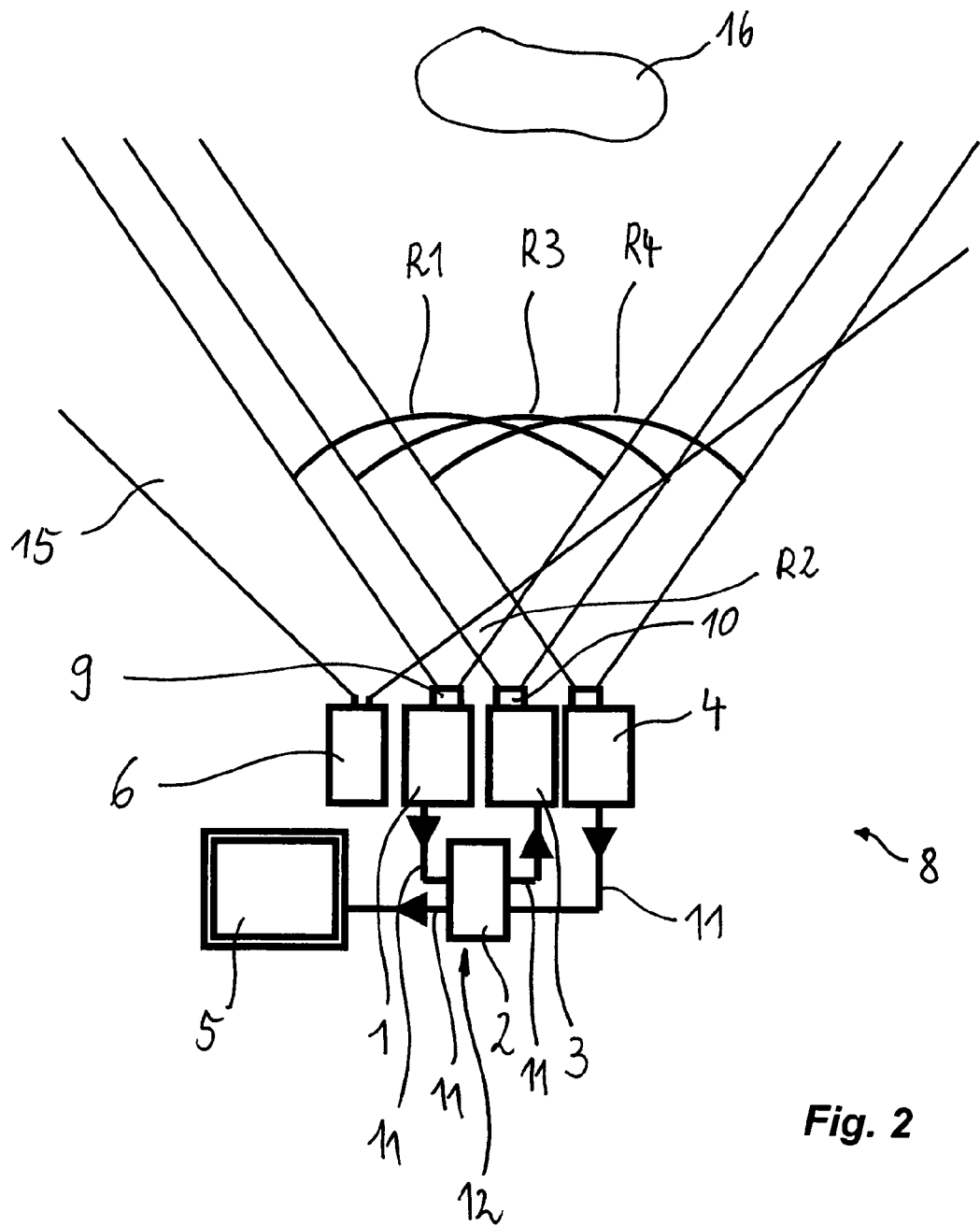
FIG. 2 is a plan view of an alternate measuring arrangement.
Figure 3:
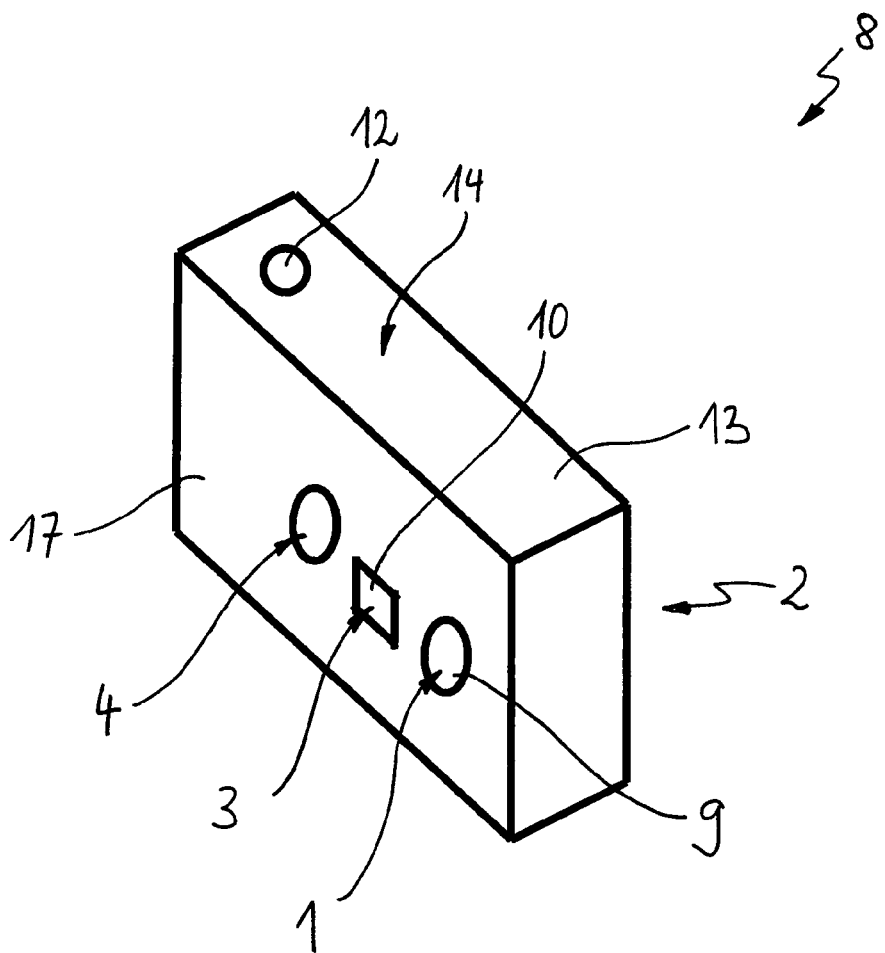
FIG. 3 is a perspective view of an exemplary housing.
Figure 4:
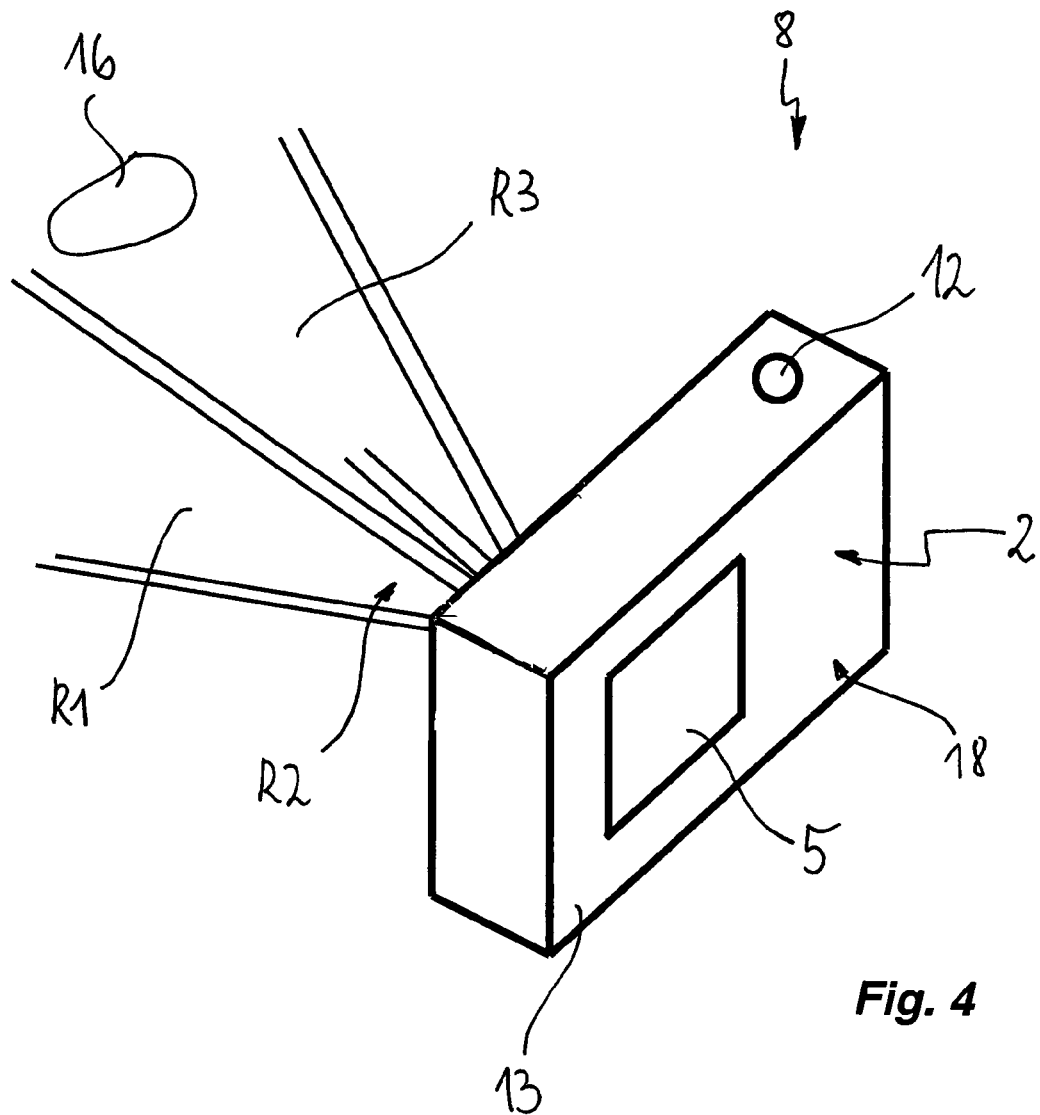
FIG. 4 is a perspective view of the other side of the housing of FIG. 3.

A preferred exemplary embodiment is a measuring arrangement 8 as an integrated instrument for carrying out the method as sketched out in FIGS. 1 and 2, which instrument can have an appearance which is similar to the schematic illustration in FIGS. 3 and 4. The measuring arrangement 8 comprises a measuring unit 1 such as e.g. a thermographic camera, a representation unit 3 such as e.g. a laser-based projector, a visual camera unit 4 for compensating for the visual object properties in the visual range and finally the conversion and data-processing unit 2, which is required to convert the measurement data into a false-color image with corresponding corrections and which for example can be implemented in the form of a programmable electronic circuit in the interior of the housing. On the rear side, which faces the user, there is a display unit 5 as a display for directly representing the measurement results and possible addition information and for interacting with the user; suitable switching elements are also expediently present. The instrument, i.e. the measuring arrangement 8, has comparable dimensions to a commercially available digital camera, and so it can easily be held and moved by the user. Ideally it comprises a power supply, for example with a battery, in order to enable mobile use and the measurement data can for example be stored on a flash-based storage card.

The attached figures serve for the exemplary and schematic explanation of the method according to the invention. Mechanical devices which spatially fix and align the elements of the arrangement with respect to one another have not been illustrated (although helpful, this is not essential to the method); this could for example be brought about by a suitable housing or else a holder. Switches and operating elements for interaction with the user and the necessary power supply of the various elements have not been illustrated either since these are not essential to the method either. The numbers for denoting the elements and the solid angles pervade all figures, and so, for example, the measuring unit is always denoted by the number 1.

FIG. 1 provides a plan view of important elements of a measuring arrangement 8 for carrying out the method according to the invention. In this case, the measuring unit 1, which has a sensor unit, is illustrated in an exemplary fashion such that the viewing direction of the sensor with an indicated objective 9 or of the sensor opening is directed upward. In this two-dimensional plan view, the observed solid angle is the angular range R1. The measurement data from the sensor unit of the measuring unit 1 reach an interposed element—the conversion and data-processing unit 2—via a suitable transmission connection, which conversion and data-processing unit enables the data-technical processing of the measurement data and the conversion into a false-color image. This false-color image is transmitted onward to the representation unit 3, which is situated next to the measuring unit 1 and is likewise directed upward and, as a result thereof, illuminates the solid angle region R3, wherein R1 is approximately or exactly equal to R3. The solid angle regions R1 and R3 overlap in a common solid angle region R2. It is furthermore possible to identify an (unwanted) parallax, which is caused by virtue of the fact that the sensor unit of the measuring unit 1 and the representation unit 3 are situated at a finite distance from one another. The parallax becomes smaller the closer together the objectives 9, 10 of 1 and 3 are.

FIG. 2 additionally represents the expansion possibilities as described in the further claims. The individual elements are interconnected for data interchange 11, which is indicated by lines. In detail, these are a camera unit 4 as a visual camera, which captures the solid angle region R4, wherein R4 advantageously equals or approximately equals R3 and/or R1; a display unit 5 with a display for the additional or alternative representation of the measurement results and for interacting with the user for operation and for aid with settings of all types; an extended apparatus for data processing with a storage means 7, in particular for storage in a volatile or non-volatile manner, like e.g. on a commercially available storage card with flash memory or for transmission to other instruments for data processing, for example via a wireless network connection; a radiation source 6 by means of which, optionally, the observed object can be irradiated or illuminated with radiation 15 in a suitable spectral range in order to enable a sufficiently strong (reflected) signal for the sensor of the measuring unit 1 for measurement purposes.

FIG. 3 represents a possible example for a specific housing form, wherein a design in the style of commercially available digital cameras was selected. What can be seen is the front side 17 of the measuring arrangement 8 housed in a housing 13, with the following three important elements: the objective 9 or the opening for the sensor of the measuring unit 1; the opening or the objective 10 for e.g. a laser-based representation unit 3, illustrated as a rectangle to indicate that there is no need for a lens system; and the visual camera of the camera unit 4, by means of which the color or brightness of the projection is corrected depending on the background, for example in accordance with the above-described advantageous embodiment no. 1 together with the above-described advantageous embodiment no. 2. For a simplified spatial orientation in comparison with FIG. 4, an exemplary operating element 12 (illustrated as a switch in an exemplary fashion) was indicated on the upper side 14 in FIG. 3, with this operating element also being found again in FIG. 4.

Arranged on the housing 13, more particularly on the upper side 14, there can also be further display units, embodied as known per se from digital cameras, for supporting the operation and/or for displaying an operating state of the measuring arrangement 8.

FIG. 4 shows the rear side 18 of the exemplary specific embodiment of FIG. 3. The display of the display unit 5 is indicated, as are the indicated solid angle regions R1 and R3 of the sensor 1 and the representation unit 3, which are relatively small due to the spatial proximity; the solid angle region R4 of the visual camera unit 4 has not been indicated in order to make the illustration slightly more clear. The exemplary operating element 12 (e.g. a switch) from FIG. 3 can once again be identified and should simplify the spatial orientation in comparison to the view from FIG. 3.

Hence, in conclusion, the following can be carried out for the invention.

1. Method for Visualization 2.1 There are properties of objects which are not visible to the human eye but can be measured in a spatially resolved manner and which have until now typically been represented on a display. The method should enable a better, more direct visualization of this property.

2.2 A measuring unit 1 or a measuring instrument 1 is used to measure a property such as e.g. the surface temperature in a spatially resolved fashion; this is converted into a false-color image, which is then transferred to a representation unit 3 and projected onto the observed object and is thus directly visualized on the object.

2.3 A forensic scientist seeking for leads at a crime scene for example uses an instrument for carrying out the method with a camera for ultraviolet light as a measuring instrument by virtue of searching the crime scene like with a "magic torch", with it not being necessary to look at a small display but rather it is possible to concentrate directly on the region to be examined, in which the otherwise invisible leads are visually highlighted by means of the projection.

In the case of a measuring arrangement 8 with a measuring unit 1, it is proposed to convert a spatially resolved measurement result of an object 16, captured by the measuring unit 1, into a false-color image and to cast or project the false-color image onto the object 16 by means of a representation unit 3.

The invention claimed is:

1. A method for visualizing spatially resolved measurement results, comprising using a measuring unit (1) to establish a spatially resolved measurement result of an object (16) and obtaining a false-color image from the spatially resolved measurement result, and in order to generate the spatially resolved measurement result, contactlessly measuring a surface temperature of the object (16) using invisible thermal radiation that is detected using a thermographic camera that captures a thermographic image of the object, and projecting the false-color image that corresponds to the object onto the object (16) by a representation unit (3), wherein at least one of a color or brightness encoding is used for the false-color image, recording at least one of color or brightness properties of the object in a visual wavelength with a camera unit at least periodically, and encoding by the measuring unit taking into account of at least one of the color or brightness properties of the object (16) such that a conversion and data processing unit (2) automatically uses a different type of false-color representation or adapts locally at least one of a brightness or a color of the projected false-color image such that a visible representation for a user is independent from a natural color of the object being observed in a visual range of the spectrum.

2. The method as claimed in claim 1, wherein the false-color image is updated continuously or repeatedly.

3. The method as claimed in claim 1, wherein the projection is carried out simultaneously with an establishment of an updated spatially resolved measurement result.

4. The method as claimed in claim 1, wherein image regions of the false-color image, which are assigned to an object region of the object (16) in each case via the spatially resolved measurement result, are projected onto the respective object regions.

5. The method as claimed in claim 1, further comprising using the representation unit (3) to project additional information onto the object (16).

6. The method as claimed in claim 1, wherein the object is illuminated uniformly for capturing at least one of color or brightness properties.

7. The method as claimed in claim 1, further comprising using a radiation source (6) to activate a property of the object (16) not immediately visible to the human eye.

8. A measuring arrangement (8), comprising a measuring unit (1), which is configured to capture a spatially resolved measurement result in a first solid angle region (R1), a conversion and data-processing unit (2), which is configured to obtain a false-color image from the spatially resolved measurement result, and a representation unit (3) for outputting a false-color image of an object, wherein the measuring arrangement (8) has a thermographic camera that captures a thermographic image of the object, by which a surface temperature of the object (16) is contactlessly measured using invisible thermal radiation, the representation unit (3) is configured to project the false-color image of the object into a second solid angle region (R3), said second solid angle region (R3) overlaps with or corresponds to the first solid angle region (R1), wherein the measuring unit and the representation unit are part of a handheld instrument, a camera unit that captures at least one of color or brightness properties of the object at least periodically, wherein the conversion and data-processing unit is configured to use at least one of a color or brightness encoding for the false-color image, which encoding takes account of the at least one of color or brightness properties of the object (16), and the conversion and data-processing unit is configured to automatically use a different type of false-color representation or adapts locally the brightness or the color of the projected false-color image such that a visible representation for a user is independent from a natural color of the object being observed in a visual range of the spectrum.

9. The measuring arrangement (8) as claimed in claim 8, wherein the measuring unit (1) and the representation unit (3) are or can be aligned with respect to one another such that a parallax is minimized.

10. The measuring arrangement (8) as claimed in claim 8, wherein the representation unit (3) has a projector or a beamer.

11. The measuring arrangement (8) as claimed in claim 8, further comprising a radiation source (6) which is configured to activate a physical property of an irradiated object (16), wherein the measuring unit (1) is sensitive to the physical property.

12. The measuring arrangement (8) as claimed in claim 8, wherein the measuring unit (1), the representation unit (3), a radiation source (6), the conversion and data-processing unit (2), and at least one of a camera unit (4) or a display unit (5) are arranged in a common housing (13).

* * * * *